Patented July 3, 1934

1,965,201

UNITED STATES PATENT OFFICE 1,965,201

AZO DYES AND METHODS FOR THEIR PREPARATION

Arthur Rowan Murphy, Penns Grove, N. J., assignor to E. I. du Pont de Nemours & Company, Wilmington, Del., a corporation of Delaware No Drawing. Application January 21, 1933, Serial No. 652,927

16 Claims. (Cl. 260—72)

This invention relates to new azo dyes and more particularly refers to trisazo dyes having the following general formula:

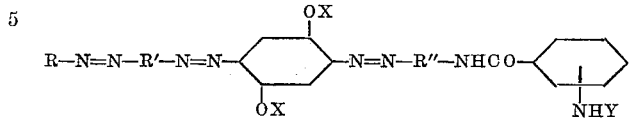

wherein R and R' represent aromatic nuclei which may be further substituted, R'' represents a naphthol-sulfonic acid nucleus, X represents alkyl or aromatic radicals which may be dissimilar, and Y represents hydrogen or an amino-benzoyl nucleus; and methods for their production.

It is an object of the present invention to produce azo dyes having excellent stability to washing and light. A further object is to produce azo dyes which impart bright attractive colors to cotton, particularly in the various shades of green. A still further object is to produce dyes which may be developed on the fiber, and which may readily be discharged. Additional objects will appear hereinafter.

These objects are attained by the present invention wherein a diazotized aromatic amino-azo compound is coupled with an amino-hydroquinone ether, the resulting amino-disazo compound being diazotized and coupled with an amino-benzoyl-amino-naphthol-sulfonic acid or an amino-benzyl-amino-benzoyl-amino-naphthol-sulfonic acid. If desired, the resulting trisazo dye may be developed on the fiber with any of the customary developing compounds such as 1-phenyl-3-methyl-5-pyrazolone.

The invention may be more thoroughly understood by reference to the following illustrative examples:

Example 1

275 grams of aniline-2-5-disulfonic acid mono-sodium salt was dissolved in 2 liters water with 40 grams sodium hydroxide. It was diazotized at 10° C. by adding 91 grams hydrochloric acid (100%) and 69 grams sodium nitrite. To this solution was added a solution of 245 grams 1-naphthylamine-7-sodium-sulfonate in 5 liters water. After the coupling was completed the amino-azo compound was diazotized at 10–15° C. by adding 91 grams hydrochloric acid (100%) and 69 grams sodium nitrite. To this diazonium compound was added a solution of 153 grams amino-hydroquinone-dimethyl-ether and 36 grams hydrochloric acid (100%) in 2.5 liters water, and then 272 grams sodium acetate crystals were added. After stirring several hours the solution was cooled to 5° C. and diazotized with 91 grams hydrochloric acid (100%) and 69 grams sodium nitrite. This diazo compound was then run into a solution of 376 grams para-amino-benzoyl-2-amino-5-naphthol-7-sulfonic acid and 170 grams ammonia in 3 liters water cooled to 0° C. with ice. After the coupling was completed the solution was warmed to 40° C. and saturated with salt to precipitate the dye which was then filtered and dried. The following formula represents its constitution:

$$\text{SO}_3\text{Na, SO}_3\text{Na}\ \text{—}\ \text{N=N}\ \text{—}\ \text{SO}_3\text{Na}\ \text{—}\ \text{N=N}\ \text{—}\ \text{OCH}_3, \text{OCH}_3\ \text{—}\ \text{N=N}\ \text{—}\ \text{OH, SO}_3\text{H}\ \text{—}\ \text{NH—CO}\ \text{—}\ \text{NH}_2$$

The product was a dark blue powder, soluble in water with a blue color. It was insoluble in concentrated sulfuric acid, but on dilution it went into solution as a blue color which then separated as a blue precipitate. When applied to cotton by the usual dyeing method it gave a blue color which on diazotization and development with 1-phenyl-3-methyl-5-pyrazolone gave a green dyeing of very good fastness and discharging properties. The constitution of the green developed color in its free acid form is probably:

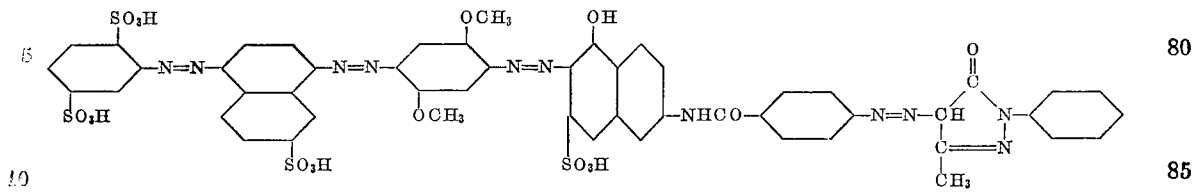

Example 2

325 grams of the mono-sodium salt of 2-naphthylamine-4-8-disulfonic acid was dissolved in 2 liters water with 40 grams sodium hydroxide, and diazotized at 10-15° C. by adding 91 grams hydrochloric acid (100%) and 69 grams sodium nitrite. To this solution was added 245 grams 1-naphthylamine-7-sodium-sulfonate dissolved in 5 liters water. After the coupling was completed the amino-azo compound was diazotized at 25-30° C. by adding 73 grams hydrochloric acid (100%) and 69 grams sodium nitrite. This diazonium compound was cooled at 10° C. and the excess mineral acid was neutralized with 70 grams sodium acetate crystals. There was added to it a suspension of amino-hydroquinone-dimethyl-ether made by dissolving 153 grams in 2.5 liters water with 37 grams hydrochloric acid (100%) and precipitating with 140 grams sodium acetate crystals. After the coupling was completed this disazo compound was diazotized with 145 grams hydrochloric acid (100%) and 76 grams sodium nitrite. After stirring one hour at 10° C. the diazo compound was run beneath the surface of a well agitated solution of 500 grams para-amino-benzoyl-para-amino-benzoyl-2-amino-5-naphthol-7-sulfonic acid and 170 grams ammonia in 2 liters water cooled to 0° C. with ice. The solution was then heated to 80° C. and the dyestuff was salted out, using about 10% of salt. The precipitate was filtered off and dried. The constitution of this product is represented by the following formula:

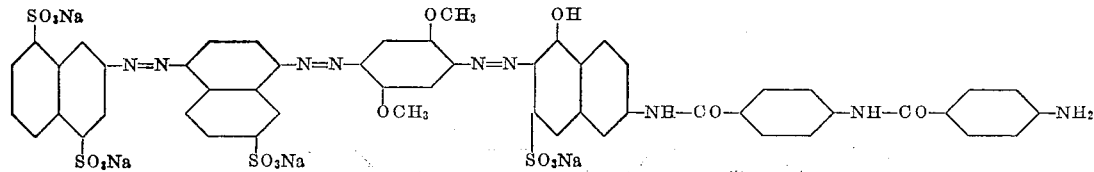

This dyestuff was similar in properties to the one given in example 1, and the developed dye was of about the same shade.

Example 3

181 grams amino-terephthalic acid was dissolved in 2 liters water with 80 grams sodium hydroxide. It was cooled to 10° C. and diazotized with 128 grams hydrochloric acid (100%) and 69 grams sodium nitrite, and then neutralized to Congo red with 70 grams sodium acetate. To this diazonium compound was added a solution of 245 grams 1-naphthylamine-7-sodium-sulfonate in 5 liters water, and the mixture was stirred at 25° C. until coupling was completed. The amino-azo compound was then dissolved with 100 grams sodium hydroxide and diazotized at 20-25° C. by adding 200 grams hydrochloric acid (100%) and 69 grams sodium nitrite. The diazonium compound was neutralized with 70 grams sodium acetate crystals and coupled with 153 grams amino-hydroquinone-dimethyl-ether, which had been dissolved in 2.5 liters water with 37 grams hydrochloric acid (100%) and precipitated with 140 grams sodium acetate crystals. After the coupling was completed the disazo compound was filtered and redissolved in 10 liters water and 106 grams sodium carbonate. It was cooled to 10° C. and diazotized by adding 240 grams hydrochloric acid (100%) and 69 grams sodium nitrite. After one hour the insoluble diazonium compound was poured into a solution of 376 grams para-amino-benzol-1-amino-8-naphthol-4-sulfonic acid and 170 grams ammonia in 3 liters water cooled with ice to 0° C. The solution was then saturated with salt, stirred several hours, and the precipitated color was filtered off and dried. The following formula is a graphical representation of its constitution:

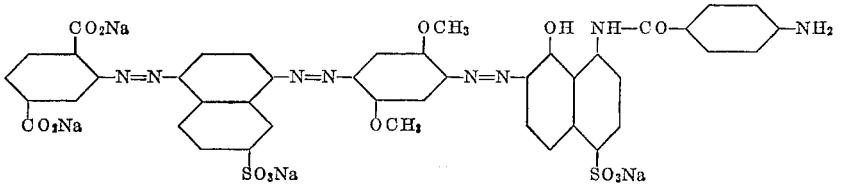

The direct cotton dyeing of this product was a greener-blue than was obtained from the products obtained in the first two examples, and after diazotization and development with 1-phenyl-3-methyl-5-pyrazolone, it gave a yellower-green of similar properties.

It is to be understood that the present invention is capable of wide variation and modification in the manner of its practical application. For example, in place of the first component, represented by R in the general formula heretofore given, other aromatic amines may be used and these amines may have substituted thereon alkyl, halogen, alkoxy, sulfonic acid, carboxylic acid, nitro and related groups. Among these amines are 6-chlor-aniline-3-sulfonic acid, 5-chlor-aniline-2-sulfonic acid, 2-amino-4-sulfo-benzoic acid, 2-chlor-5-amino-4-sulfo-benzoic acid, 5-nitro-aniline-2-sulfonic acid, and 1-amino-8-naphthol-3-6-disulfonic acid.

The second component is an aromatic amine which couples para to the amino group, and which may have additional groups substituted thereon. Alpha-naphthylamine-sulfonic acids which couple in the 4-position are preferred for this component, although the invention is not limited thereto. Compounds which fall within this class and which have been used with satisfactory results are 1-naphthylamine-2-sulfonic acid, 1-naphthylamine-7-sulfonic acid, 2-methoxy-1-naphthylamine-6-sulfonic acid, 2-ethoxy-1-naphthylamine-6-sulfonic acid, and 2-methoxy-1-naphthylamine-7-sulfonic acid.

The third component is an amino-hydroquinone-ether, either aliphatic or aromatic ethers being suitable, although the alkyl ethers are preferred. These ethers may be the same or dissimilar, and they may belong to either the aliphatic or aromatic series or they may belong to both series. It may here be mentioned that amino-hydroquinone-dimethyl-ether is preferred, although other ethers such as the diethyl-ether and dibenzyl-ether give satisfactory results. This component may have additional groups, for example alkyl groups, substituted thereon.

The end component is an amino-benzoyl-amino-naphthol-sulfonic acid or an amino-benzoyl-amino-benzoyl-amino-naphthol - sulfonic acid, wherein the amino groups may occupy different positions on the benzoyl nucleus, the J-acid, S-acid and M-acid derivatives being preferred. Examples of such compounds are para-amino - benzoyl - J - acid, para - amino-benzoyl-para - amino - benzoyl-J-acid, meta-amino-benzoyl - J-acid, meta-amino-benzoyl-meta-amino-benzoyl - J-acid, para-amino-benzoyl-meta-amino-benzoyl-J-acid, para-amino-benzoyl-S-acid, and meta-amino-benzoyl-M-acid. Where a yellow shade of green is desired the S-acid derivatives appear to be preferable. On the other hand, the J-acid derivatives have been found to produce colors which are somewhat faster to washing.

As is well known J-acid is 2-amino-5-hydroxy-7-sulfonic acid, S-acid is 1-amino-8-hydroxy-4-sulfonic acid and M-acid is 1-amino-5-hydroxy-7-sulfonic acid.

The several factors such as temperature, time of reaction and proportions of reacting substances may also be varied within rather wide limits without departing from the scope of the present invention. In addition, the customary means whereby undesirable side reactions are eliminated or greatly reduced may be incorporated herein in the practical application of the present invention.

The present invention produces dyes of excellent stability to light and washing. These dyes impart attractive colors to cotton, particularly desirable shades of green. Moreover, the imparted colors may be discharged from the material quite readily and effectively. The shades produced are much brighter and more attractive than those produced from somewhat related compounds, apparently due to the presence of the amino-hydroquinone-ether component.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling a diazotized aromatic amino-azo compound with an amino-hydroquinone-ether, diazotizing the resulting amino-disazo compound and coupling it with a member selected from the group consisting of amino-benzoyl-amino-naphthol-sulfonic acids and amino-benzoyl-amino-benzoyl-amino-naphthol-sulfonic acids.

2. A process for producing azo dyes which comprises coupling a diazotized aromatic amino-azo compound the components of which are members of the benzene or naphthalene series with an amino-hydroquinone-alkyl-ether, diazotizing the resulting amino-disazo compound and coupling it with a member selected from the group consisting of amino-benzoyl-amino-naphthol-sulfonic acids and amino-benzoyl-amino-benzoyl-amino-naphthol-sulfonic acids.

3. A process for producing azo dyes which comprises coupling a diazotized aromatic amine of the benzene or naphthalene series which may have substituted thereon members selected from the group consisting of alkyl, halogen, alkoxy, sulfonic, carboxylic and nitro radicals, with an alpha-naphthylamine-sulfonic acid which couples in the position para to the amino group, diazotizing the resulting amino-azo compound and coupling it with amino-hydroquinone-dimethyl-ether, diazotizing the resulting amino-disazo compound and coupling it with a member selected from the group consisting of para-amino - benzoyl-, meta - amino - benzoyl-, para-amino-benzoyl-para-amino-benzoyl-, meta-amino-benzoyl-meta-amino-benzoyl-, para-amino-benzoyl-meta-amino-benzoyl-, and meta-amino-benzoyl-para-amino-benzoyl-J, -S, or -M acid.

4. A process for producing azo dyes which comprises coupling a diazotized amino-benzene-sulfonic acid which may have substituted thereon members selected from the class consisting of alkyl, halogen, alkoxy, sulfonic acid, carboxylic acid and nitro groups with alpha-naphthylamine-6-sulfonic acid or alpha-naphthylamine-7-sulfonic acid, diazotizing the resulting amino-azo compound and coupling it with 2-5-dimethoxy-aniline, diazotizing the resulting amino-disazo compound and coupling it with a member selected from the group consisting of para-amino-benzoyl-, meta-amino-benzoyl-, para-amino-benzoyl-para-amino-benzoyl-, meta-amino-benzoyl-meta-amino-benzoyl-, para-amino-benzoyl-meta-amino-benzoyl-, and meta-amino-benzoyl-para-amino-benzoyl-J, -S, or -M acid.

5. A process for producing azo dyes which comprises coupling a diazotized amino-benzene-disulfonic acid with alpha-naphthylamine-7-sulfonic acid, diazotizing the resulting amino-azo compound and coupling it with 2-5-dimethoxy-aniline, diazotizing the resulting amino-disazo compound and coupling it with a member selected from the group consisting of para-amino-benzoyl-, meta-amino-benzoyl-, para-amino-benzoyl-para-amino-benzoyl-, meta-amino-benzoyl-meta-amino-benzoyl-, para-amino-benzoyl-meta-amino-benzoyl-, and meta-amino-benzoyl-para-amino-benzoyl-J, -S, or -M acid.

6. A process for producing an azo dye which comprises coupling diazotized aniline-2-5-disulfonic acid with 1-naphthylamine-7-sulfonic acid, diazotizing the resulting amino-azo compound and coupling it with amino-hydroquinone-dimethyl-ether, diazotizing the resulting amino-disazo compound and coupling it with para-amino - benzoyl - 2-amino-5-naphthol-7-sulfonic acid.

7. A process for producing an azo dye which comprises coupling diazotized 2-naphthylamine-4-8-disulfonic acid with 1-naphthylamine-7-sulfonic acid, diazotizing the resulting amino-azo compound and coupling it with amino-hydroquinone-dimethyl-ether, diazotizing the resulting amino-disazo compound and coupling it with para-amino-benzoyl-para-amino-benzoyl-2-5-naphthol-7-sulfonic acid.

8. A process for producing an azo dye which comprises coupling diazotized amino-terephthalic acid with 1-naphthylamine-7-sulfonic acid, diazotizing the resulting amino-azo compound and coupling it with amino-hydroquinone-dimethyl-ether, diazotizing the resulting amino-disazo compound and coupling it with para-amino-benzoyl-1-amino-8-naphthol-4-sulfonic acid.

9. Azo dyes having the following general formula:

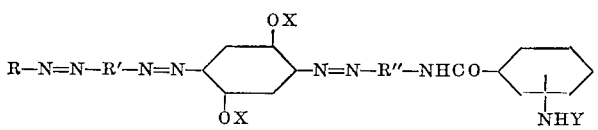

wherein R and R' represent aromatic nuclei, R'' represents a naphthol-sulfonic acid nucleus, X represents alkyl or aromatic radicals which may be dissimilar and Y represents hydrogen or an amino-benzoyl-nucleus.

10. Azo dyes having the following general formula:

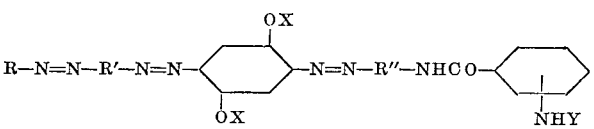

wherein R and R' represent aromatic nuclei of the benzene or naphthalene series, R'' represents a naphthol-sulfonic acid nucleus, X represents alkyl radicals which may be dissimilar, and Y represents hydrogen or an amino-benzoyl nucleus.

11. Azo dyes having the following general formula:

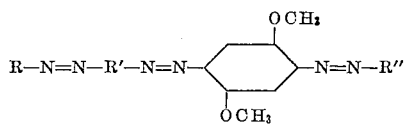

wherein R represents an aromatic nucleus of the benzene or naphthalene series which may have substituted thereon alkyl, halogen, alkoxy, sulfonic, carboxylic and nitro radicals, R' represents the residue of an alpha-naphthylamine-sulfonic acid which couples in the position para to the amino group, and R'' represents the residue of a para-amino-benzoyl-, meta-amino-benzoyl-, para-amino-benzoyl-para-amino-benzoyl-, meta-amino-benzoyl-meta-amino-benzoyl-, para-amino-benzoyl-meta-amino-benzoyl-, or meta-amino-benzoyl-para-amino-benzoyl-J, -S, or -M acid.

12. Azo dyes having the general formula:

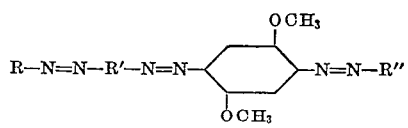

wherein R represents the residue of an amino-benzene-sulfonic acid which may have substituted thereon members selected from the class consisting of alkyl, halogen, alkoxy, sulfonic acid, carboxylic acid and nitro groups, R' represents the residue of 1-naphthylamine-6-sulfonic acid or 1-naphthylamine-7-sulfonic acid, and R'' represents the residue of a para-amino-benzoyl-, meta-amino-benzoyl-, para-amino-benzoyl-para-amino-benzoyl-, meta-amino-benzoyl-meta-amino-benzoyl-, para-amino-benzoyl-meta-amino-benzoyl-, or meta-amino-benzoyl-para-amino-benzoyl-J, -S, or -M acid.

13. Azo dyes having the following general formula:

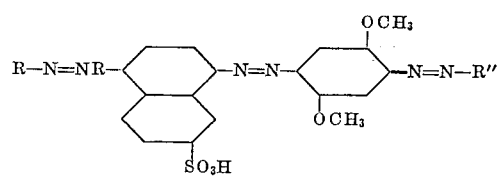

wherein R represents the residue of an amino-benzene-disulfonic acid, and R'' represents the residue of a para-amino-benzoyl-, meta-amino-benzoyl-, para-amino-benzoyl-para-amino-benzoyl-, meta-amino-benzoyl-meta-amino-benzoyl-, para-amino-benzoyl-meta-amino-benzoyl-, or meta-amino-benzoyl-para-amino-benzoyl-J acid, -S, or -M acid.

14. An azo dye having the following formula:

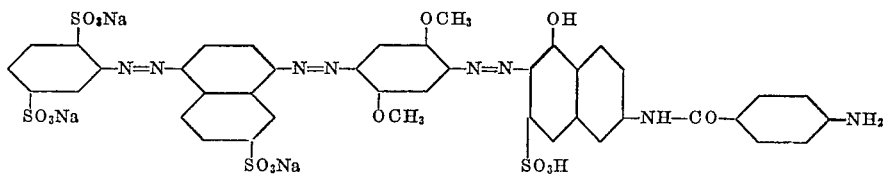

15. An azo dye having the following formula:

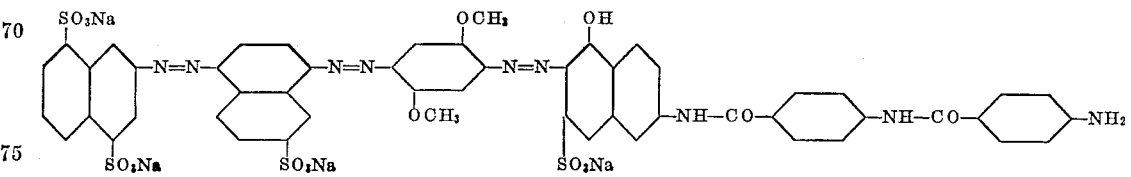

16. An azo dye having the following formula:

[Structural formula: benzene ring with CO₂Na, CO₂Na substituents —N=N— naphthalene (SO₃Na) —N=N— benzene with OCH₃, OCH₃ —N=N— naphthalene (OH, SO₃Na, NH—CO—) —benzene—NH₂]

ARTHUR R. MURPHY.

CERTIFICATE OF CORRECTION.

Patent No. 1,965,201.                                              July 3, 1934.

ARTHUR ROWAN MURPHY.

It is hereby certified that error appears in the printed specification of the above numbered patent requiring correction as follows: Page 1, line 32, for "benzyl" read benzoyl; page 2, line 103, for "benzol" read benzoyl; and page 4, line 3, claim 7, after "2-" insert amino-; and that the said Letters Patent should be read with these corrections therein that the same may conform to the record of the case in the Patent Office.

Signed and sealed this 7th day of August, A. D. 1934.

Leslie Frazer (Seal)                                              Acting Commissioner of Patents.